(12) United States Patent
Reis et al.

(10) Patent No.: US 9,465,273 B2
(45) Date of Patent: Oct. 11, 2016

(54) PHOTONIC MICRO-STRUCTURED VACUUM-ULTRAVIOLET RADIATION SOURCE BASED ON SOLID-STATE FREQUENCY CONVERSION

(71) Applicant: The Board of Trustees of the Leland Stanford Junior University, Palo Alto, CA (US)

(72) Inventors: David Reis, Palo Alto, CA (US); Philip Howard Bucksbaum, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 228 days.

(21) Appl. No.: 14/546,602

(22) Filed: Nov. 18, 2014

(65) Prior Publication Data

US 2015/0139262 A1 May 21, 2015

Related U.S. Application Data

(60) Provisional application No. 61/906,822, filed on Nov. 20, 2013.

(51) Int. Cl.
*H01S 3/03* (2006.01)
*G02F 1/355* (2006.01)
*G02F 1/35* (2006.01)

(52) U.S. Cl.
CPC ........... *G02F 1/3555* (2013.01); *G02F 1/3544* (2013.01); *G02F 1/3551* (2013.01)

(58) Field of Classification Search
CPC .. G02F 1/3555; G02F 1/3544; G02F 1/3551; G02F 1/35; H01S 3/0315; H01S 3/063; H01S 3/108; H01S 3/03; H01S 3/1086; H01S 3/1083; H01S 3/0092; H01S 3/109; H01S 3/1095; H01S 5/0092; H01S 5/5054; H01S 5/32308; H01S 2301/06; H01S 2301/03
USPC .......................................... 372/5, 21, 22, 64
See application file for complete search history.

(56) References Cited

U.S. PATENT DOCUMENTS

| | | | | |
|---|---|---|---|---|
| 5,166,948 A | * | 11/1992 | Gavrilovic | C09K 11/7771 372/41 |
| 5,786,102 A | * | 7/1998 | Paz-Pujalt | C09K 11/7772 427/585 |
| 2002/0080834 A1 | * | 6/2002 | Kusunose | B82Y 10/00 372/25 |
| 2010/0304059 A1 | * | 12/2010 | Besson | C03C 3/00 428/34 |

* cited by examiner

*Primary Examiner* — Jessica Manno
*Assistant Examiner* — Delma R Forde
(74) *Attorney, Agent, or Firm* — Lumen Patent Firm

(57) ABSTRACT

A coherent extreme ultraviolet (XUV) radiation source is provided that includes a non-linear optical conversion material solid substrate disposed for nonlinear conversion of infrared (IR) coherent radiation into XUV coherent radiation, where the solid substrate includes an IR coherent radiation region, and an XUV coherent radiation waveguide region, where the IR coherent radiation region is optically coupled to the XUV coherent radiation waveguide region, where the XUV coherent radiation converted from the IR coherent radiation by the non-linear optical conversion material propagates in and outputs from the XUV coherent radiation waveguide region.

20 Claims, 9 Drawing Sheets

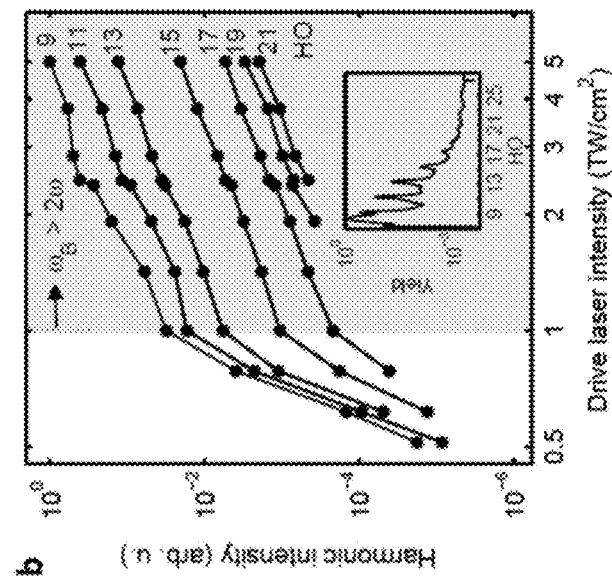
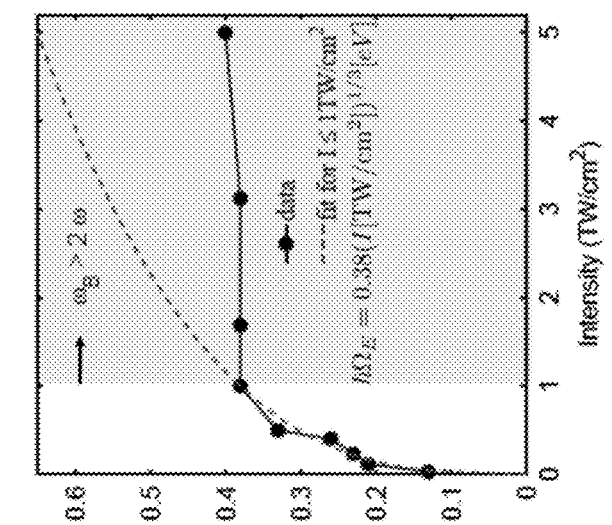
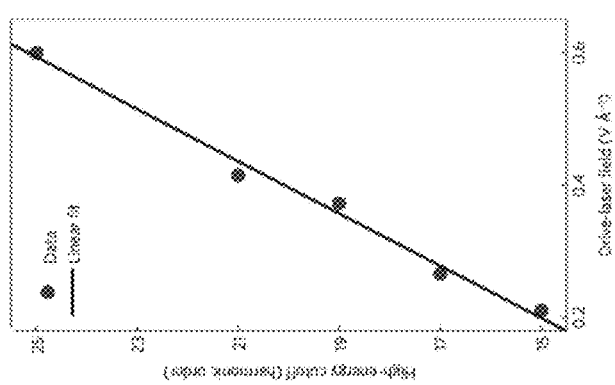
FIG. 7A
FIG. 7B

PHOTONIC MICRO-STRUCTURED VACUUM-ULTRAVIOLET RADIATION SOURCE BASED ON SOLID-STATE FREQUENCY CONVERSION

CROSS-REFERENCE TO RELATED APPLICATIONS

This application claims priority from U.S. Provisional Patent Application 61/906,822 filed Nov. 20, 2013, which is incorporated herein by reference.

FIELD OF THE INVENTION

The current invention generally relates to ultraviolet radiation. More specifically, the invention relates to extreme nonlinear conversion of long-wavelength optical radiation (the pump) to the vacuum-ultraviolet (VUV) and extreme ultraviolet (XUV) in bulk crystalline media.

BACKGROUND OF THE INVENTION

The physics of strong-field laser interactions with solids is largely unexplored but is known to involve the nonperturbative sub-cycle motion of electrons and the radiation of high harmonics. Control of these extreme, nonlinear, coupled light-matter interactions for the generation of short wavelength coherent radiation has been problematic. The understanding of the strong-field response in solids is in its early stages, which is markedly different than in dilute gases.

For efficient XUV generation minimizing loss and maximizing the interaction length between the MIR and XUV have been challenging. Further, for attosecond pulse generation including XUV frequency combs, control of the spectral phase of the harmonics to mitigate linear and nonlinear dispersive phase characteristics of the pump propagation is needed.

XUV radiation is highly desirable for investigating and modifying nanoscale structures and ultrafast processes in microelectronics, marking, materials science, and surface physics and chemistry. Its advantages include sub-micron wavelength to provide high spatial resolution, strong absorption to provide surface sensitivity, wavelength-dependent absorption to provide elemental specificity, and attosecond oscillation period to enable the formation of attosecond pulses of coherent radiation. No known source combines all these advantages. However, currently available sources of XUV radiation must employ cumbersome vacuum chambers that contain windowless gas-phase regions or bulky electron accelerators. The vacuum chambers are needed because the existing sources are large and/or incompatible with the matter under investigation, and because XUV radiation cannot travel far in solids or in air. This limits the applications.

What is needed is a solid state device that utilizes non-perturbative light-matter interactions in solids through the combined nanophotonic and strong-field control of light, to provide a compact efficient high repetition rate tunable source of broad-band coherent XUV radiation for spectroscopy, attosecond science, XUV frequency combs, and similar applications.

SUMMARY OF THE INVENTION

To address the needs in the art, a coherent extreme ultraviolet (XUV) radiation source is provided that includes a non-linear optical conversion material solid substrate disposed for nonlinear conversion of infrared (IR) coherent radiation into XUV coherent radiation, where the solid substrate includes an IR coherent radiation region, and an XUV coherent radiation waveguide region, where the IR coherent radiation region is optically coupled to the XUV coherent radiation waveguide region, where the XUV coherent radiation converted from the IR coherent radiation by the non-linear optical conversion material propagates in and outputs from the XUV coherent radiation waveguide region.

According to one aspect of the invention, the optical coupling of the IR coherent radiation region to the XUV coherent radiation waveguide region comprises a phase matched coupling. In one aspect, the phased match coupling is disposed to output an attosecond XUV pulse. In another aspect, the phase match coupling is disposed to output the coherent XUV radiation having a bandwidth corresponding to a Fourier transform limited pulse duration in the range 1 femtosecond to 100 picoseconds.

In a further aspect of the invention, the optical coupling of the IR coherent radiation region to the XUV coherent radiation waveguide region comprises a quasi-phase matched coupling.

According to another aspect of the invention, the XUV waveguide channel includes a plurality of parallel XUV waveguides coupled to the IR coherent radiation region.

In yet another aspect of the invention, the IR coherent radiation region includes one or a plurality of IR waveguides coupled to the XUV waveguide.

In a further aspect of the invention, the IR coherent radiation region includes one or a plurality of IR waveguides coupled to a plurality of XUV waveguides.

According to one aspect of the invention, the XUV coherent radiation waveguide region includes a single-mode XUV coherent radiation waveguide region.

In a further aspect of the invention, the XUV coherent radiation waveguide region includes a multi-mode XUV coherent radiation waveguide region.

In another aspect of the invention, the XUV coherent radiation waveguide region includes a vacuum XUV coherent radiation waveguide region.

According to a further aspect of the invention, the IR coherent radiation region includes a single-crystal IR coherent radiation region.

In one aspect of the invention, the IR coherent radiation region includes a polycrystalline IR coherent radiation region.

In yet another aspect of the invention, the IR coherent radiation region includes an amorphous IR coherent radiation region.

According to one aspect of the invention, the IR coherent radiation region is disposed adjacent to the XUV coherent radiation waveguide region.

In a further aspect of the invention, the IR coherent radiation region includes an IR pump region disposed adjacent to at least a top of the XUV coherent radiation waveguide region, a bottom of the of the XUV coherent radiation waveguide region, a left side of the XUV coherent radiation waveguide region, a right side of the XUV coherent radiation waveguide region, or coaxial to the XUV coherent radiation waveguide region. In one aspect, the IR pump region includes a dispersive feature disposed along a beam path of the IR pump beam. Here, the dispersive feature includes a plurality of dispersive features disposed along the beam path of the IR pump beam. Further, the dispersive feature includes a cavity in the IR pump region, wherein the dispersive feature has a cross section shape that can include a circle, rectangle, or trapezoid. In one aspect, the XUV coherent radiation waveguide region includes an array of the XUV waveguides, where the array of XUV waveguides are collinearly arranged, where the IR pump region is disposed between adjacent the XUV waveguides, about the adjacent XUV waveguides, or between and about the adjacent XUV waveguides.

BRIEF DESCRIPTION OF THE DRAWINGS

FIGS. 7A-7B show (7A) Field-induced redshift in the ZnO absorption edge follows a (Franz-Keldysh) model for photon-assisted tunneling up to 1 TW/cm$^2$, (7B) dependence of the yield of the MIR harmonics with the laser intensity show a kink in the scaling at the same intensity, where in both (7A) and (7B) the shaded region represents a high-intensity regime where the Bloch frequency exceeds twice the MIR frequency, according to the current invention.

DETAILED DESCRIPTION

The current invention combines photonic waveguide technology and nonlinear frequency conversion in solid materials to achieve simultaneous guiding of and coupling between the pump and frequency converted beams. By combining photonics waveguide technologies across a wide spectral range, a new mechanism for scalable and compact coherent-short wavelength generation in solid-state materials is provided. More specifically, extreme nonlinear conversion of long-wavelength optical radiation (the pump) to the vacuum-ultraviolet or extreme ultraviolet (XUV) in structured crystalline media is provided, where the generation mechanism in bulk would be limited by self-absorption of the converted short-wavelength radiation.

Figure 1A:
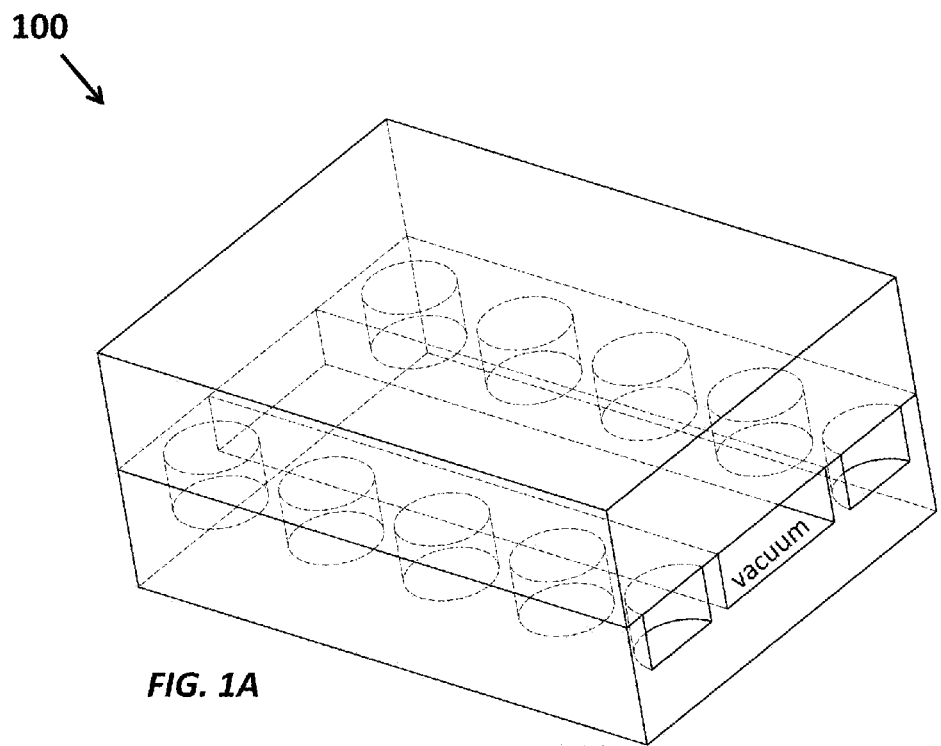
FIGS. 1A-1B show a nanophotonic structure that provides simultaneous guiding of IR and XUV coherent radiation. The IR pump generates XUV harmonics that are coupled to a low loss vacuum guiding region, according to embodiments of the current invention.
Figure 1B:
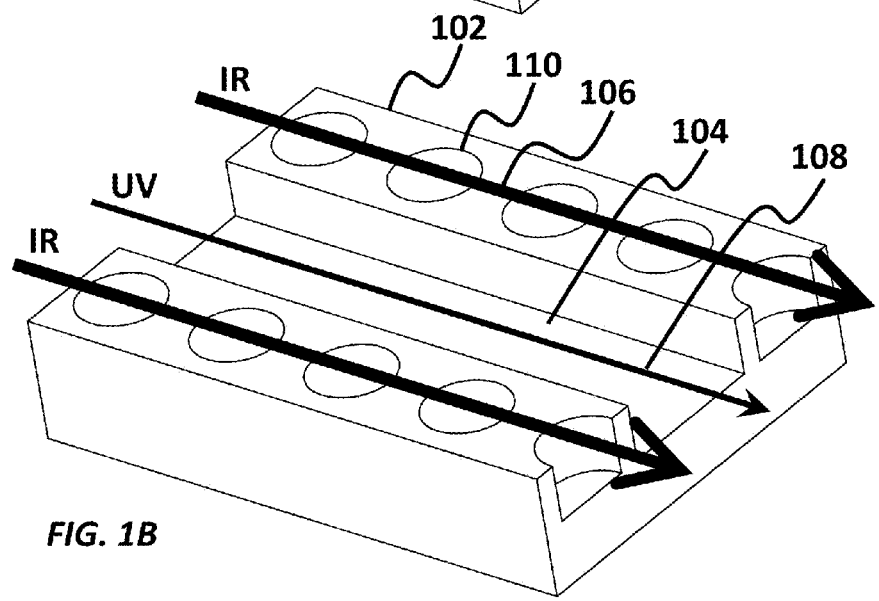

An exemplary embodiment is a photonic waveguide structure 100 designed to confine and guide both the infrared (IR) pump beam 106 and the generated XUV radiation 108 simultaneously, having coupled dielectric material 102 and vacuum regions 104, as shown in FIGS. 1A and 1B. The IR pump beam 106 is confined and guided substantially in the material region 102, where it generates XUV via nonlinear frequency conversion. The generated XUV 108 is coupled to and guided in the vacuum region 104, where the losses are low. Phase matching may be achieved by suitable choice of the geometry. Additional photonic structures, or dispersive features 110 may be introduced to enhance dispersion control to enable either wavelength-selective phase matching or quasi-phase matching. This allows for the extreme nonlinear conversion of long-wavelength radiation to the vacuum-ultraviolet with higher efficiency, higher power and less loss than what is currently available in the art.

Figure 2A:
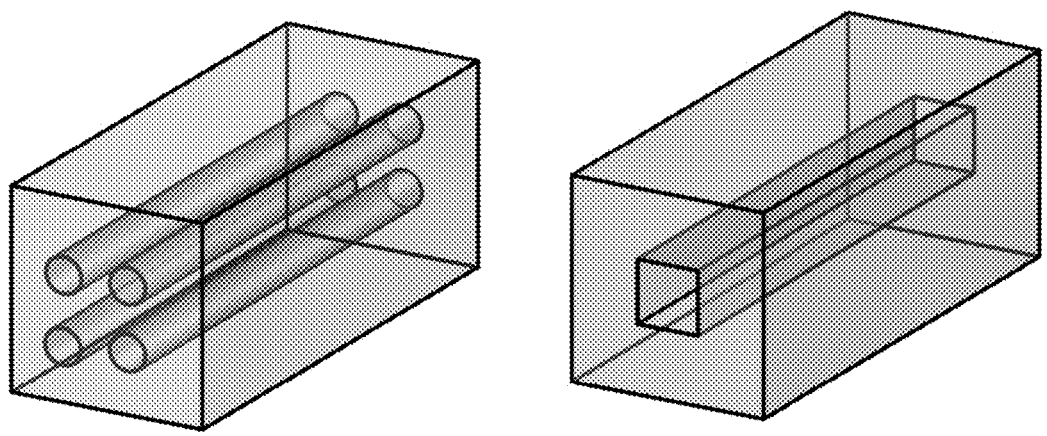
FIGS. 2A-2D show coupled XUV and IR regions (2A), cross section geometries (2B), channel configurations (2D), and multiple XUV waveguide alignment (2D) according to embodiments of the invention.
Figure 2B:
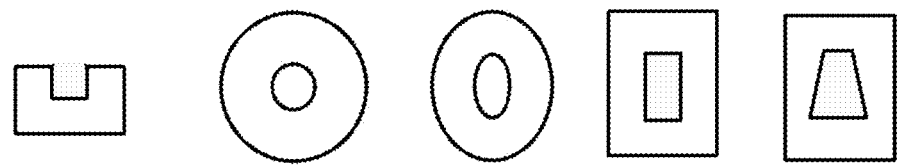

FIGS. 2A-2D show a single and multiple XUV waveguide geometries (see FIG. 2A). FIG. 2B shows different diffraction feature geometries that include a circle, an oval, a polygon such as a rectangle or a trapezoid.

Figure 2C:
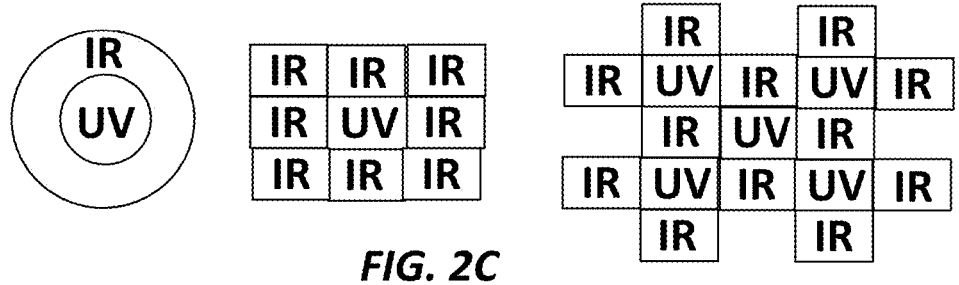
Figure 2D:
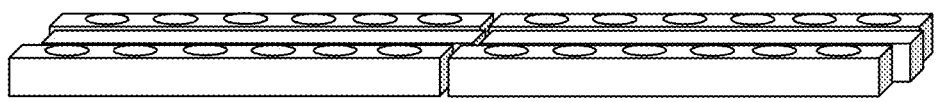

In another aspect of the invention, the IR channel includes one or a plurality of IR waveguides coupled to the XUV waveguide, where some channel configurations are shown in FIG. 2C, where the IR channel includes one or a plurality of IR waveguides coupled to a plurality of XUV waveguides. According to embodiments of the invention, the IR coherent radiation waveguide region is disposed adjacent to at least a part of the XUV coherent radiation waveguide region, or coaxial to the XUV coherent radiation waveguide region. In one aspect of the invention, the optical coupling of the IR coherent radiation region to the XUV coherent radiation waveguide region comprises a quasi-phase matched coupling. According to one aspect of the invention, the XUV coherent radiation waveguide region includes a single-mode XUV coherent radiation waveguide region. FIG. 2D shows In one aspect, the XUV coherent radiation waveguide region includes an array of the XUV waveguides, where the array of XUV waveguides are collinearly arranged, where the IR pump region is disposed between adjacent the XUV waveguides, about the adjacent XUV waveguides, or between and about the adjacent XUV waveguides.according to embodiments of the invention.

According to one aspect of the invention, the IR coherent radiation region includes a single-mode IR coherent radiation region. In a further aspect of the invention, the IR coherent radiation region includes a multi-mode IR coherent radiation region. In another aspect of the invention, the XUV coherent radiation waveguide region includes a vacuum XUV coherent radiation waveguide region. According to a further aspect of the invention, the IR coherent radiation region includes a single-crystal IR coherent radiation region. In one aspect of the invention, the IR coherent radiation region includes a polycrystalline IR coherent radiation region.

Some key aspects of the invention include the combination of photonic materials with solid-state XUV generation, and the mechanism for increasing the interaction length over the bulk material.

This current invention provides significant advantages over the current art. Photonic guiding provides the advantage of effectively separating XUV generation from the guiding, which allows for engineering dispersion and minimizing loss, which results in a source that is scalable to high powers (both average and peak), higher efficiency and shorter wavelengths.

The current invention provides structures that simultaneously confine and guide few cycle IR pump or mid-IR pump in the material region while coupling the generated HHG into vacuum channels that confine and guide attosecond XUV radiation.

The current invention is capable of controlling nonlinear propagation, achieving phase matching, and scaling to the high repetitions rates that are desired for the direct transfer of optical frequency combs into the XUV at the chip-level.

Figure 3A:
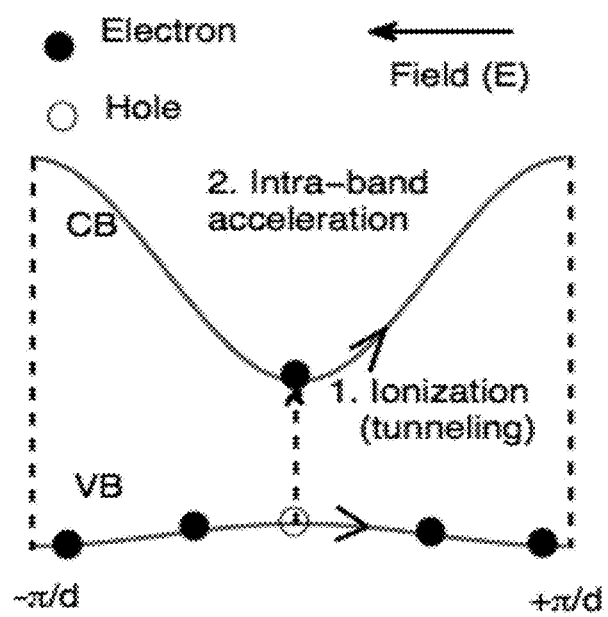
FIGS. 3A-3C show (3A) cartoon of two-step model for high-harmonic generation in insulating crystals, (3B, 3C) calculations for semiclassical current.
Figure 3B:
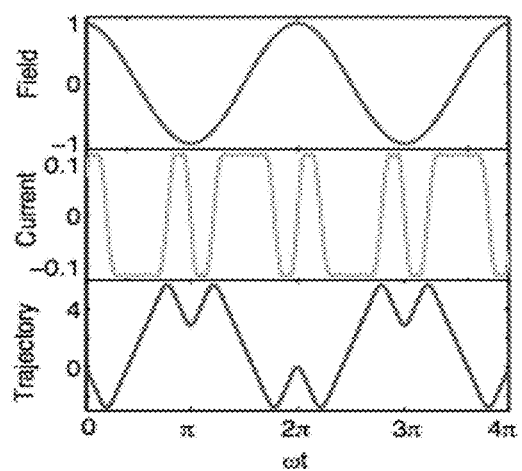
Figure 3C:
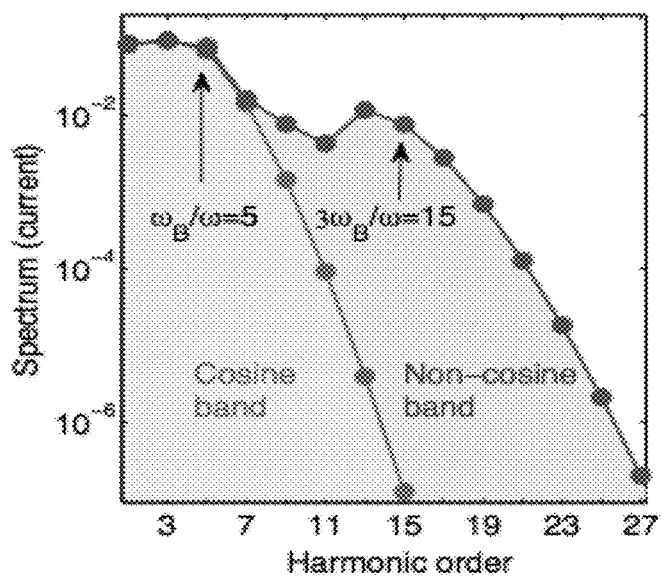

This invention makes use of several aspects of the physics of strong-field laser-solid interactions. In the strong-field limit, the interaction between light and matter can no longer be treated perturbatively. In this case, the material properties can depend as much on the applied field as the interatomic forces. For crystalline dielectrics and photon energy well below the band-gap, $\hbar\omega \ll \in_g$, this also corresponds to the tunneling-limit where the Keldysh adiabaticity parameter $\gamma^* = \sqrt{\in_g/4U^*_p} \ll 1$. Here $U^*_p = (eF)^2/4m^*\omega^2$ is the ponderomotive energy of an electron-hole pair with reduced band-effective mass m* in an oscillating field, F. However, because of band dispersion, the dynamics can become much richer than that obtained for a constant effective mass and the usual Keldysh formalism breaks down as you approach the tunneling limit. This is the regime in which solid-state high harmonics are generated. A similar regime exists for high harmonics in gases, but the situation can be richer in solids because of the band structure of the conduction bands. Semiclassically the electrons (and holes) acquire enough momentum in the field to traverse the entire Brillouin zone (see FIGS. 3A-3C) within a single half cycle of the field, resulting in rich attosecond dynamics where the effective mass of the electrons is strongly time-dependent, and the ponderomotive energy is limited by the electronic bandwidth, at least to the extent that tunneling to higher bands is ignored. While the full dynamics must take into account both intraband and interband transitions on an equal footing, the (spatial and temporal) periodicity of the strong-field Hamiltonian enforces coherence between the electrons, even under strong localization. In this case, the coherent electron motion becomes highly nonlinear experiencing sub-cycle dynamics including the onset of elastic Bragg scattering from the Brillouin zone boundaries at peak rate given by the Bloch frequency $\omega_b/2\pi = eFa/h$ which becomes temporally modulated by the oscillating laser field. Two new adiabatic parameters are introduced, $\chi = \omega_b/2\omega$ and $\Omega = \hbar\omega_b/\in_g$, which are the ratio of the Bloch frequency to twice the drive frequency and the field-free band-gap respectively. $\chi \sim 1$ corresponds roughly to the electrons undergoing a single full Bloch oscillation per half laser cycle, while $\Omega = 1$ corresponds to the bonding limit where a free electron gains the band-gap energy when accelerated across a single lattice constant (i.e, when the Wannier Stark levels are spaced by the bandgap).

Investigations of high-order light matter interactions in solids have concentrated on the multiphoton, perturbative limit, up to the transition to the strong-field regime, for example and are often limited by dielectric breakdown. However, with the recently availability of long-wavelength and few cycle IR pulses, much stronger fields can be applied to materials without breakdown. A combination of recent experimental and theoretical evidence, strongly suggests that when transparent solids are subjected to ultrashort strong fields, in the limit that $\gamma^* \ll 1$, $U^*_p \gg \hbar\omega$, $\chi > 1$, $\Omega \sim 1$:

The damage limit for few-cycle femtosecond pulses in the tunneling-regime can well exceed that for many cycle pulses in the multiphoton regime.

The light-matter interaction involves the sub-optical cycle, attosecond collective motion of electrons leading to a nonlinear current that drives HHG.

The period of Bloch oscillations is shorter than a single optical cycle, and much shorter than the pulse duration and the characteristic time-scale of electron-electron and electron-phonon interaction times, leading to fast Wannier-Stark (WS) localization.

The WS localization limits electron excursion in the strong field and, consequently, suppresses collisions with impurities.

The electronic-structure is modified in the presence of the field. The bands are coupled in a nonperturbative, but adiabatic and reversible fashion limiting real carrier excitations.

Turning now to the design and characterization of nanophotonic structures for implementing this invention. According to the current invention, the linear and nonlinear properties of artificial nanophotonic structures simultaneously guide both the long-wavelength pump and short wavelength XUV radiation. In one aspect, the structures are tailored to achieve phase-matching between the pump and XUV, where the generation and loss to achieve optimum coupling of the XUV to the vacuum channel is provided. Further, control of the nonlinear propagation of the MIR and its impact on the spectral phase of the harmonics is disclosed, and the low-loss coupling of the pump into the structures is achieved. Finally, generation of high efficiency compact attosecond XUV pulses and frequency combs are provided.

Low-loss nanophotonic light guiding and concentration at wavelengths spanning from the near visible portion of the UV to the mid-IR has been demonstrated, as well as tailored nonlinear optical frequency conversion between visible and IR. The current invention extends these nanophotonic concepts into the XUV, for the simultaneous low-loss propagation high harmonics phased with the IR pump. This is particularly important given that the efficiency of HHG is limited in bulk materials by phase-matching for light radiated below the band-gap and strong absorption above the band-gap. In a further aspect of the invention a vacuum core is provided into a material waveguide to propagate XUV with minimal loss.

Figure 4:
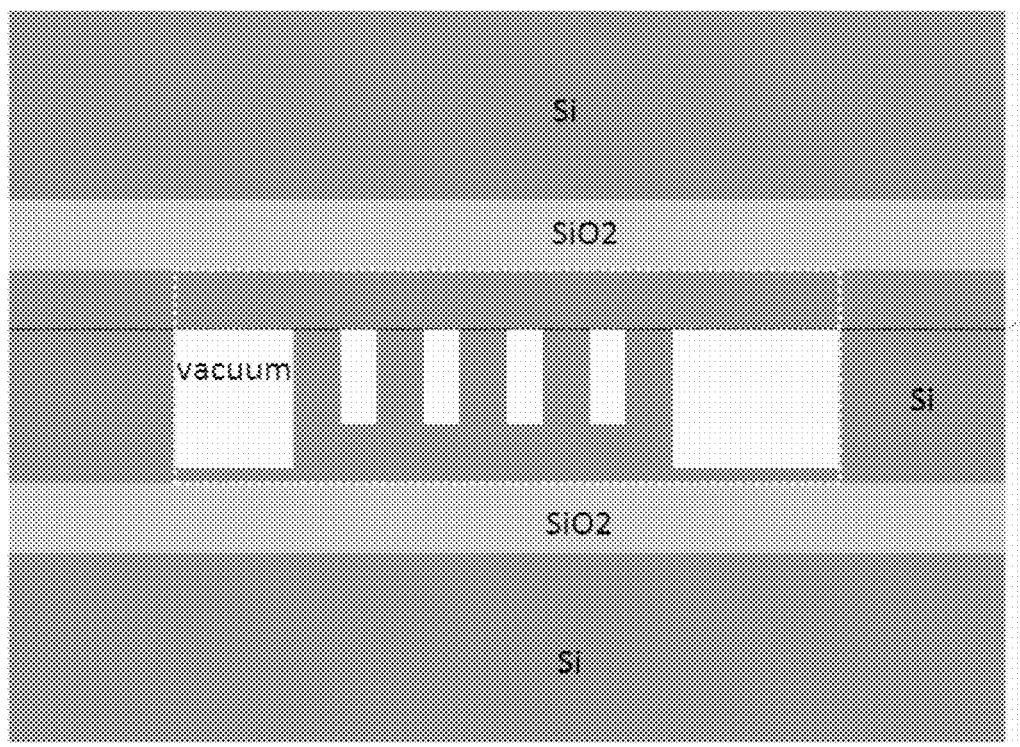
FIG. 4 show a cross-section view of a XUV waveguide with IR pump guided in the dashed region, while small white rectangles at the center represent XUV waveguides, according to one embodiment of the invention.

The vacuum-core surrounded by metal or dielectric cladding acts like a waveguide for the above-gap harmonics based on total internal reflection, since the real part of the refractive index is less than unity in the XUV. The same cladding for the XUV can also serve as a waveguide for the MIR drive. For illustrative purposes, consider the simple silicon waveguide as shown in FIG. 4. At a mid-IR wavelength (~4 μm), this waveguide provides single-mode guiding in the dielectric region with strong-sub-wavelength confinement. At an energy of 25 eV, (or a wavelength of 49.6 nm), this structure provides XUV guiding in the center vacuum cores. While this example is multimode for the XUV, the modal dispersion in is expected to be low.

In one exemplary embodiment, silicon is used because it is relatively easy to fabricate into structures and has an absorption coefficient in the ~20-100 eV range that is about an order of magnitude lower than most dielectrics. For low intensity IR light well below the indirect gap (~1.1 eV), silicon is essentially lossless for an on-chip propagation distance, but highly-lossy above the direct gap (~3.4 eV). However, for the guided structure of FIG. 4, the high-harmonic field is largely concentrated in the vacuum region, which suppresses the propagation loss. The loss can be controlled through the size of the vacuum core region. Here, the propagation length can extend into cm scale. Effective generation and coupling of the harmonics requires overlap of the modes in both vacuum and material, and thus implies loss. The efficiency requires a balance of the HHG gain with the coupling into vacuum. Additional dispersion control is incorporated to allow phase-matching or quasi-phase matching, according to one embodiment. Because of the high loss in bulk, coherence lengths only need to be on order tens hundreds of microns to have a huge impact on the efficiency over what is currently available in the art.

Figure 5A:
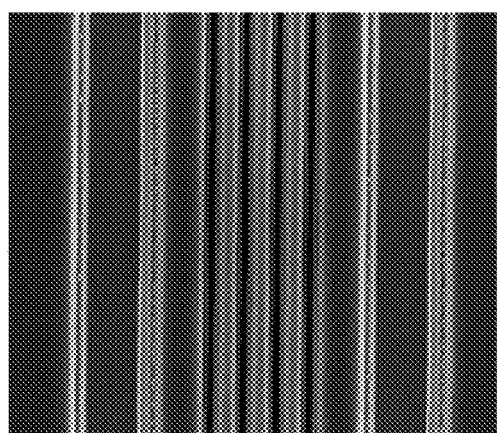
FIGS. 5A-5B show SEM images vacuum channels (dark stripes) fabricated in Si wafer (light gray), (5A) 300 nm, (5B) 80 nm wide channels, according to embodiments of the current invention.
Figure 5B:
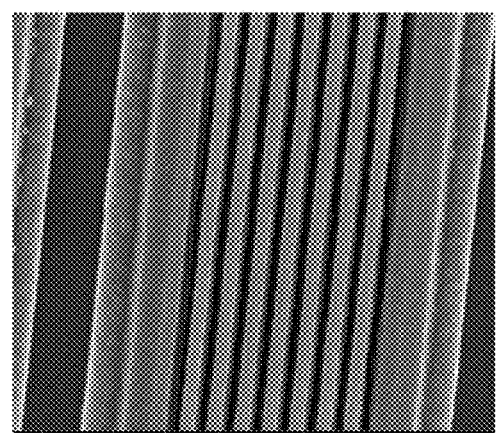
Figure 6A:
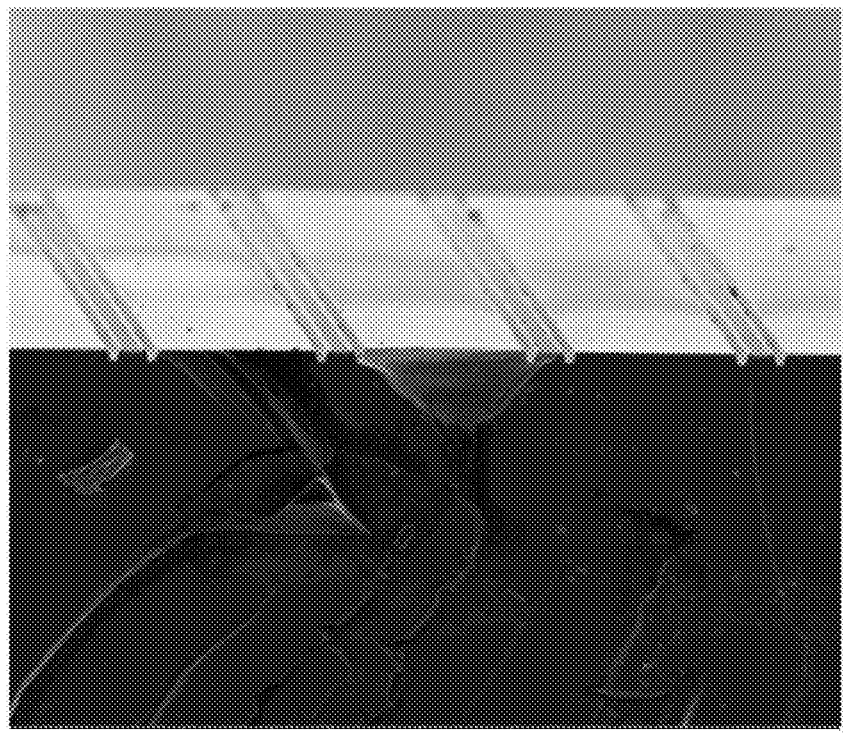
FIGS. 6A-6D show (6A-6C) SEM images vacuum channels (dark stripes) fabricated in Si wafer (light gray), (6D) the etch rate is strongly dependent on channel width, according to the current invention.
Figure 6B:
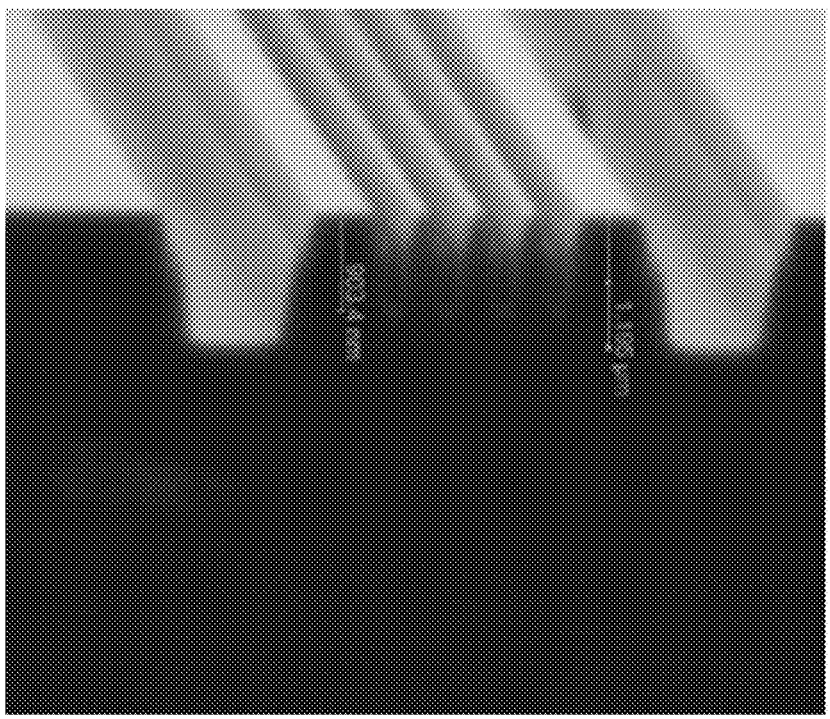
Figure 6C:
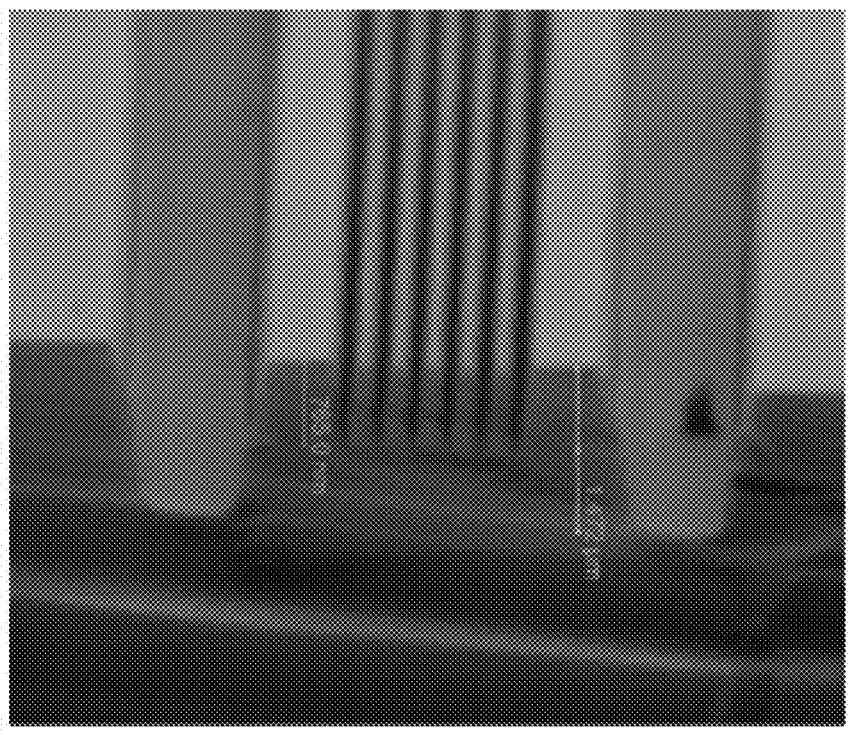
Figure 6D:
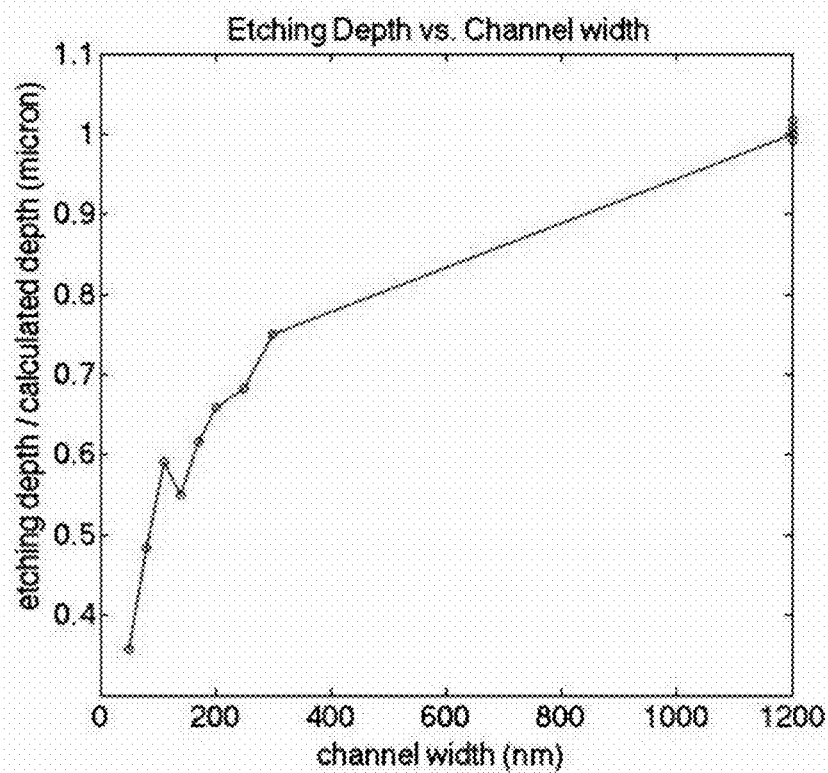

Some exemplary fabricated embodiments of multi-resonant structures shown in FIGS. 5A-5B. The fabrication process is extensive and involves multiple stages of electron beam (e-beam) resist spinning onto silicon on insulator (SOI) wafers, e-beam writing and developing, etching, removal of resist, and wafer bonding to another SOI wafer. The bonded wafers are diced into smaller samples, and the sample facets are polished. The initial fabrication results were based on etching and wafer bonding Si (instead of SOI) wafers, as they are less expensive, and allowed them to optimize the fabrication process.

FIGS. 5A-5B show scanning electron micrographs (SEMs) of the vacuum channels before the wafer bonding (corresponding to the structures under the dashed black line in FIG. 4). The dark regions are the etched vacuum channels, and the light gray regions are Si. FIG. 5A shows the structure with 300 nm wide vacuum channels, and the one on the right has 80 nm wide channels. Dry etching rates for the wider channels are higher than for the narrower ones. This automatically leads to the deeper confining regions of the IR waveguide than the XUV channels, as shown in the design (FIG. 4) and fabricated structures (FIG. 6A-6D).

In a further embodiment, a wafer bonding process was performed and these structures were subsequently capped with another Si wafer. Other embodiments are optimized to improve coupling efficiency, modal overlap etc.

As described above strong field interactions in solids leads to Wannier-Stark localization and Bloch oscillations. One of the frontier challenges is the phenomena leading to optical breakdown in this regime, where as the reversibility of the strong-field phenomena becomes more challenging when scaling to higher repetition rates.

Early experiments on HHG in bulk crystals used sub-100 fs pulses of MIR (~10 cycle 3.25 μm) at fields comparable to the bonding strength of the band gap per lattice constant (~V/Å). It was found that the high-energy cutoff of the harmonics varied linearly with electric field (consistent with Bloch oscillation shown in FIG. 3A), but that the generated harmonics extended much higher in energy than the Bloch frequency. In addition, a strong red-shift was measured in the transient absorption of near band gap light in the presence of the strong field. It was found that the red-shift agrees with a photon-assisted tunneling picture (i.e. for $\gamma^* \ll 1$ as calculated for the detuning from the band-gap) until $\chi=1$ was reached, the same point at which the scaling of the HHG changes abruptly indicating strong non-parabolic band behavior and the onset of Bloch oscillations (see FIGS. 7A-7B).

Figure 8:
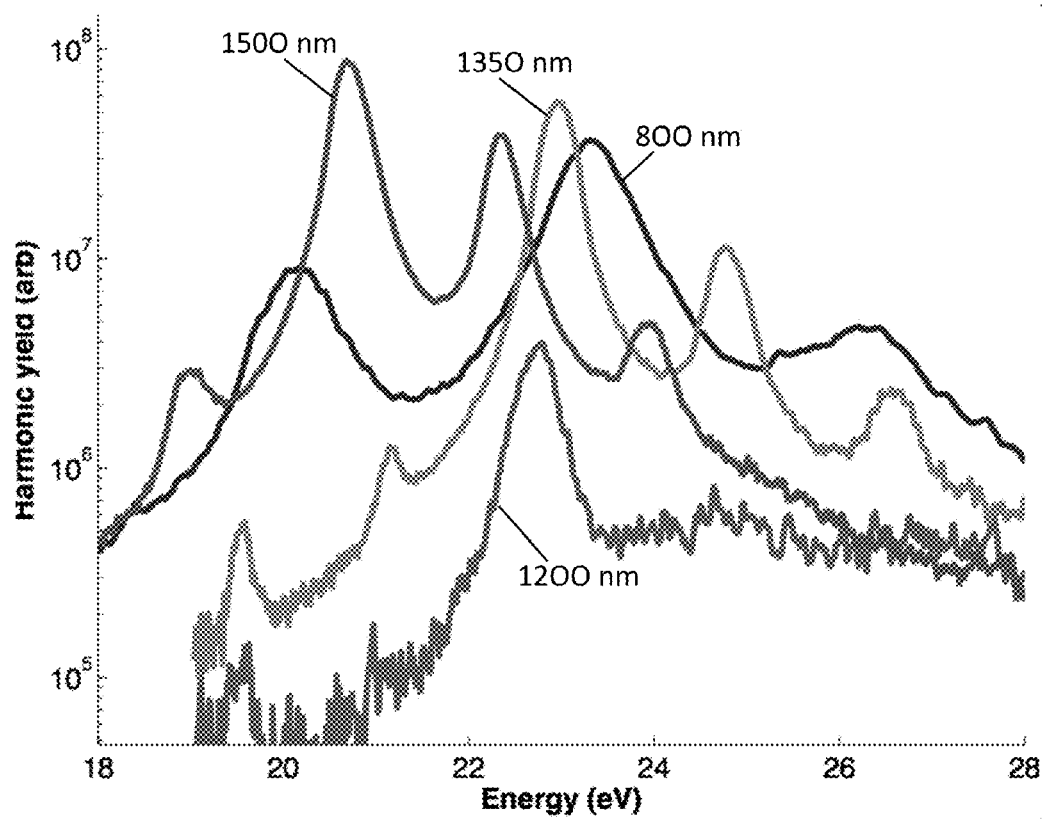
FIG. 8 show a portion of HHG spectrum produced in MgO for different wavelengths at peak field ~0.8 V/Å; the spectrum extends at least ten times the Bloch frequency for fields along the [111] direction.

The strong-field phenomenon in solids appears to be general for long-wavelength excitation with short pulses. The inventors have observed it in bulk Si, bulk and nanoparticles of MgO, ZnO bulk and films and even in solid Ar with drive wavelengths ranging from the NIR to MIR). FIG. 8 shows the HHG spectrum from bulk MgO that extends to ~25 eV for several pump wavelengths ranging from 800 nm to 1500 nm. The measured harmonic energies well exceeds both the band-gap and conduction bandwidth, and are many times the Bloch frequency (~few eV for 0.8V/Å drive).

Figure 9:
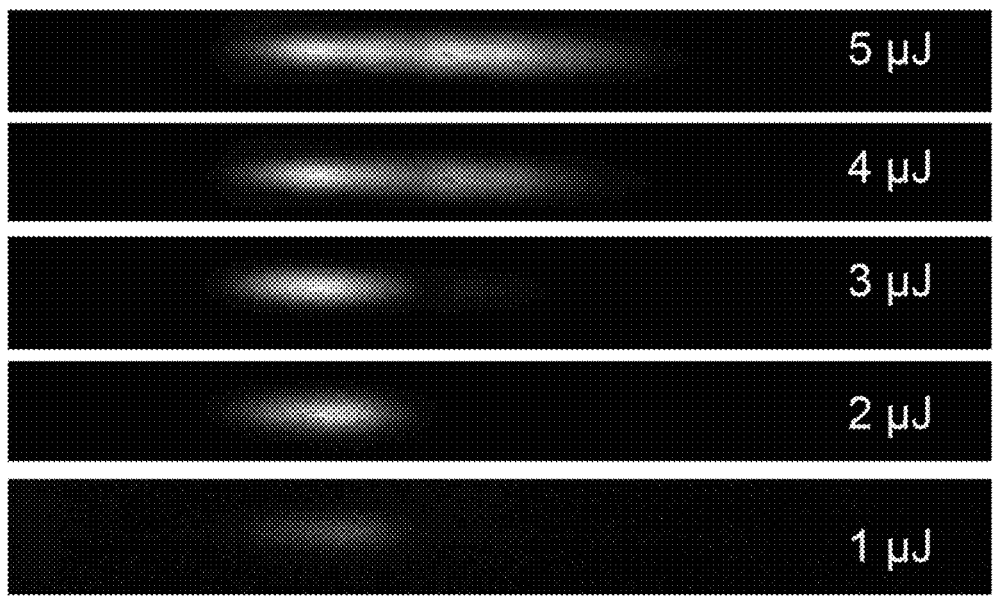
FIG. 9 show $7^{th}$ harmonic of 3.25 µm, 50 fs drive laser in 25 µm bulk Si (above the indirect and below the direct gap), where 5 µJ corresponds to an estimate field of 0.4 V/Å, the horizontal axis covers ~0.5 eV with redder wavelengths to the right, where the spectrum breaks up with increasing field, presumably due to nonlinear propagation of the pump and is very sensitive to the focal conditions.

The inventors have further observed high-harmonics in bulk silicon as a result of preliminary feasibility studies of Si-based structures. The experiments used ~50 fs, 3.25 μm radiation by difference frequency generation in a Ti:sapphire pumped optical parametric amplifier. n-doped (phosphorous up to $10^{20}$ cm$^{-3}$), p-doped (boron up to $10^{20}$ cm$^{-3}$) and undoped samples all with 25 μm thickness were used. In each case, harmonics above the indirect gap at relatively low intensity ($<10^{12}$ W/cm$^2$, $<0.3$ V/Å) were observed, suggesting a route towards much higher harmonics. The presence of doping does not seem to negatively impact the ability to support high fields without breakdown. However, depending on focusing conditions the harmonics break-up both spectrally and spatially. FIG. 9 shows the spectrum of a single harmonic ($7^{th}$) for the undoped sample under conditions where only spectral breakup is observed. The horizontal scale corresponds to <1 eV. Notably, qualitatively similar results occur for 200 μm ZnO (that were not present for 100 fs pulses) again suggesting that nonlinear beam propagation needs to be carefully managed as becomes possible with photonics structures.

In one example, for the MIR pump-source is used as an optical parametric amplifier pumped by a kHz Ti:sapphire laser, with longer wavelength obtained by difference frequency generation between the signal and idler. The kHz source delivers sub-50 fs pulses with tens to hundreds of μJ depending on the wavelength. Given the strong sub-wavelength confinement in the structures (such as shown in FIG. 3), only nanojoules of pulse energy per waveguide are sufficient to reach the nonperturbative limit. This allows for pumping at a much higher repetition rate. For this a different pump is used, for example using a ~100 MHz Yb fiber pumped OPO based on periodically poled LiNbO$_3$. It has been shown that greater than a 50% (photon) conversion into 2 μm light with ~50 fs pulses is possible, and reaching 4 μm is within the scope of the invention.

The present invention has now been described in accordance with several exemplary embodiments, which are intended to be illustrative in all aspects, rather than restrictive.

Thus, the present invention is capable of many variations in detailed implementation, which may be derived from the description contained herein by a person of ordinary skill in the art. For example variations and modifications include: Wavelength of the pump laser; Wavelength and bandwidth of the XUV radiation; Nature of the crystalline material; Use of quasi-phase-matching; Use of non-crystalline or composite materials; Phasing of multiple waveguides; Attosecond pulse generation and pulse shaping; Narrowband XUV generation; Polarization control. Applications include coherent short wavelength radiation for manufacturing, metrology, marking, inspection, lithography, spectroscopy, and attosecond pulse generation.

All such variations are considered to be within the scope and spirit of the present invention as defined by the following claims and their legal equivalents.

What is claimed:

1. A coherent extreme ultraviolet (XUV) radiation source, comprising a solid substrate, wherein said solid substrate comprises a non-linear optical conversion material disposed for nonlinear conversion of infrared (IR) coherent radiation into XUV coherent radiation, wherein said solid substrate comprises:

a. an IR coherent radiation region; and b. an XUV coherent radiation waveguide region, wherein said IR coherent radiation region is optically coupled to said XUV coherent radiation waveguide region, wherein said XUV coherent radiation that is converted from said IR coherent radiation by said non-linear optical conversion material, propagates in and outputs from said XUV coherent radiation waveguide region.

2. The XUV radiation source of claim 1, wherein said optical coupling of said IR coherent radiation region to said XUV coherent radiation waveguide region comprises a phase matched coupling.

3. The XUV radiation source of claim 2, wherein said phased match coupling is disposed to output an attosecond XUV pulse.

4. The XUV radiation source of claim 2, wherein said phase match coupling is disposed to output said coherent XUV radiation having a Fourier transform limited pulse duration in the range 1 femtosecond to 100 picoseconds.

5. The XUV radiation source of claim 1, wherein said optical coupling of said IR coherent radiation region to said XUV coherent radiation waveguide region comprises a quasi-phase matched coupling.

6. The XUV radiation source of claim 1, wherein said XUV waveguide channel comprises a plurality of parallel XUV waveguides coupled to said IR coherent radiation region.

7. The XUV radiation source of claim 1, wherein said IR coherent radiation region comprises at least one IR waveguide coupled to said XUV waveguide.

8. The XUV radiation source of claim 1, wherein said IR coherent radiation region comprises at least one IR waveguide coupled to a plurality of XUV waveguides.

9. The XUV radiation source of claim 1, wherein said XUV coherent radiation waveguide region comprises a single-mode XUV coherent radiation waveguide region.

10. The XUV radiation source of claim 1, wherein said XUV coherent radiation waveguide region comprises a multi-mode XUV coherent radiation waveguide region.

11. The XUV radiation source of claim 1, wherein said XUV coherent radiation waveguide region comprises a vacuum XUV coherent radiation waveguide region.

12. The XUV radiation source of claim 1, wherein said IR coherent radiation region comprises a single-crystal IR coherent radiation region.

13. The XUV radiation source of claim 1, wherein said IR coherent radiation region comprises a polycrystalline IR coherent radiation region.

14. The XUV radiation source of claim 1, wherein said IR coherent radiation region comprises an amorphous IR coherent radiation region.

15. The XUV radiation source of claim 1, wherein said IR coherent radiation region is disposed adjacent to at least a top of said XUV coherent radiation waveguide region, a bottom of said of said XUV coherent radiation waveguide region, a left side of said XUV coherent radiation waveguide region, a right side of said XUV coherent radiation waveguide region, or coaxial to said XUV coherent radiation waveguide region.

16. The XUV radiation source of claim 1, wherein said IR coherent radiation region comprises an IR pump region disposed adjacent to at least a top of said XUV coherent radiation waveguide region, a bottom of said of said XUV coherent radiation waveguide region, a left side of said XUV coherent radiation waveguide region, a right side of said XUV coherent radiation waveguide region, or coaxial to said XUV coherent radiation waveguide region.

17. The XUV radiation source of claim 16, wherein said IR pump region comprises a dispersive feature disposed along a beam path of said IR pump beam.

18. The XUV radiation source of claim 17, wherein said dispersive feature comprises a plurality of said dispersive features disposed along said beam path of said IR pump beam.

19. The XUV radiation source of claim 17, wherein said dispersive feature comprises a cavity in said IR pump region, wherein said dispersive feature has a shape selected from the group consisting of a circle, a rectangle, and a trapezoid.

20. The XUV radiation source of claim 16, wherein said XUV coherent radiation waveguide region comprises an array of said XUV waveguides, wherein said array of XUV waveguides are collinearly arranged, wherein said IR pump region is disposed between adjacent said XUV waveguides, about said adjacent XUV waveguides, or between and about said adjacent XUV waveguides.

* * * * *